Sept. 29, 1925.
H. A. INMAN ET AL
1,555,010
BOX MAKING MACHINE
Filed Nov. 15, 1922
9 Sheets-Sheet 1
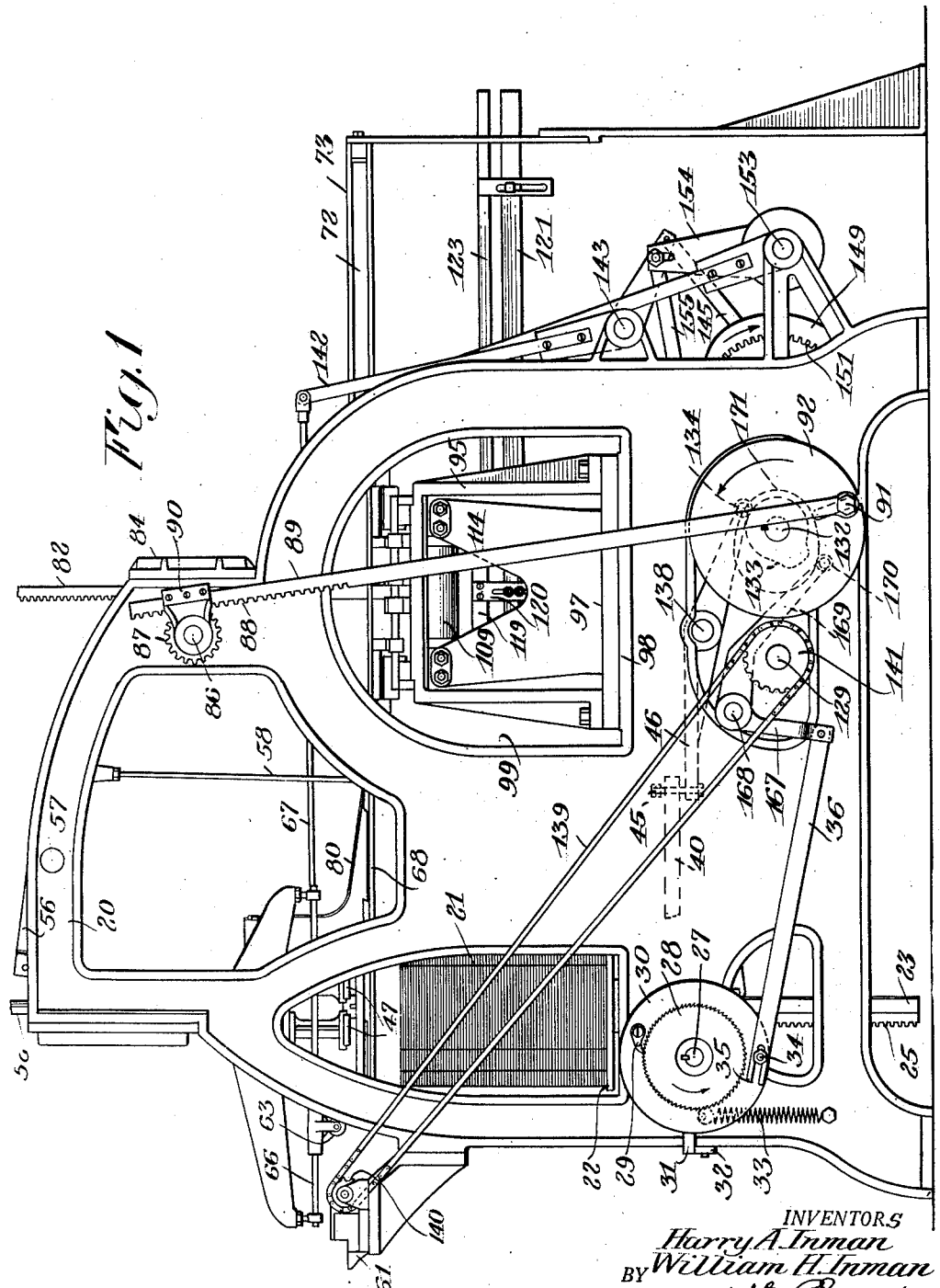
INVENTORS
Harry A. Inman
BY William H. Inman
their ATTORNEY

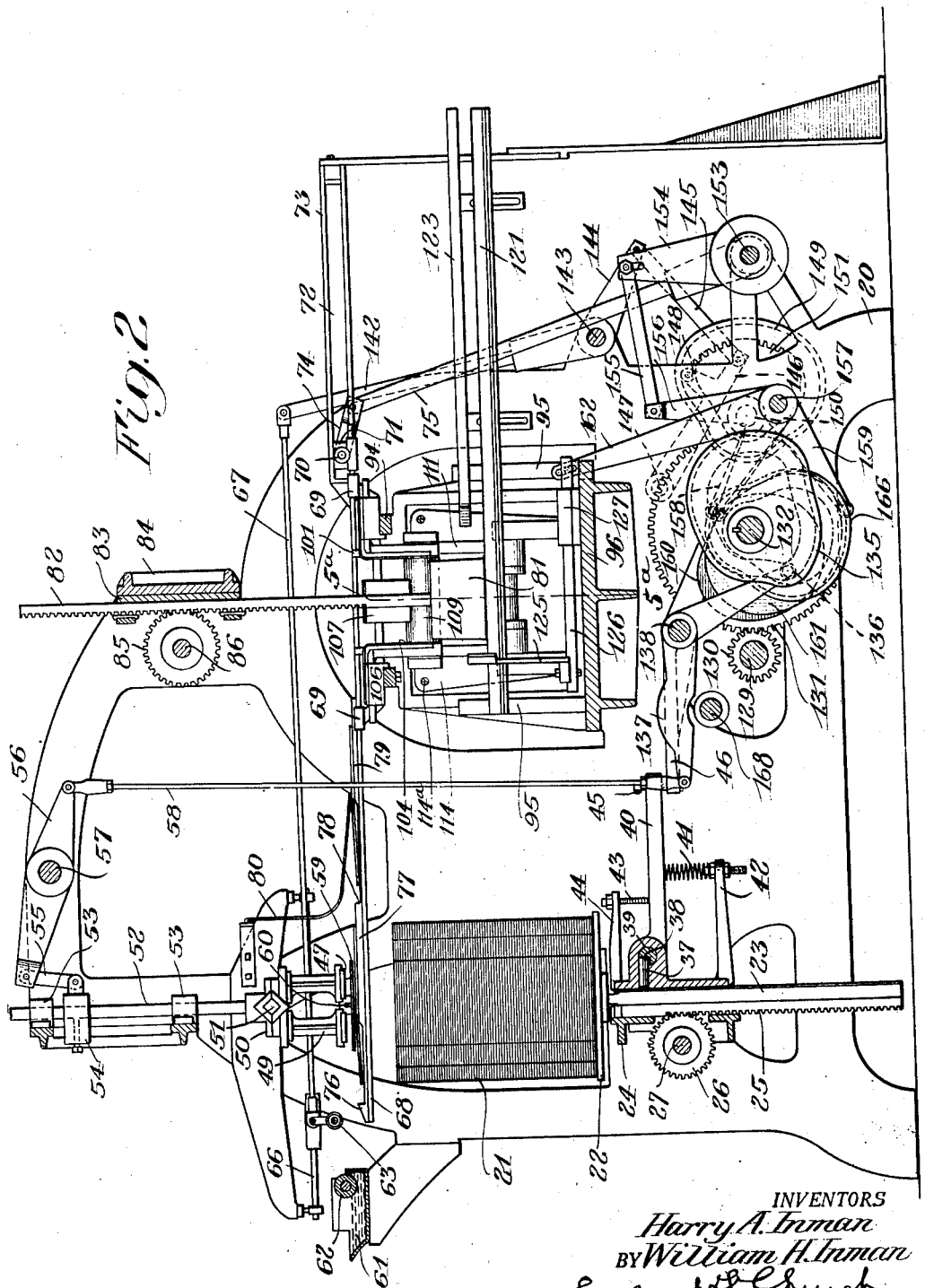

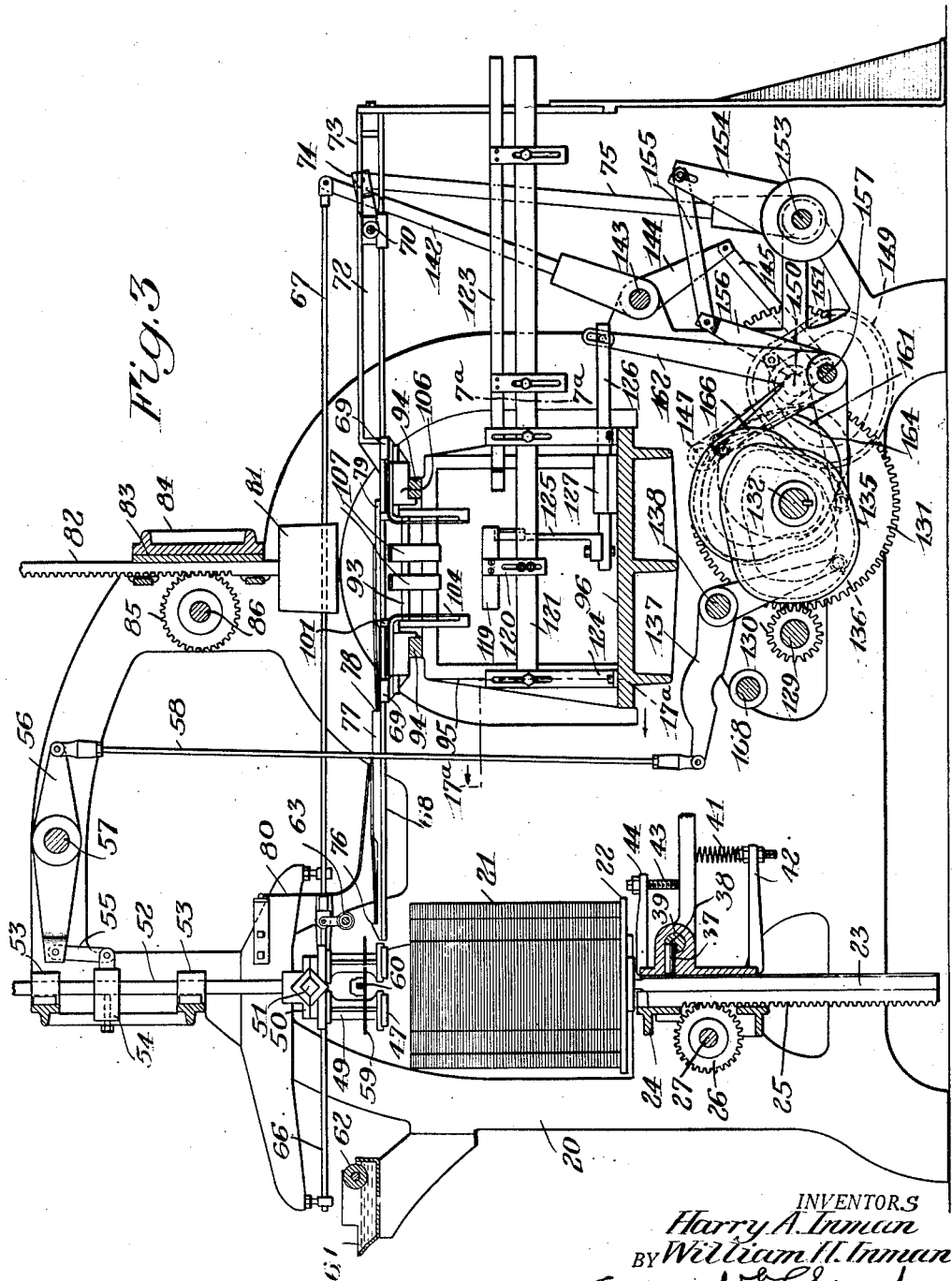

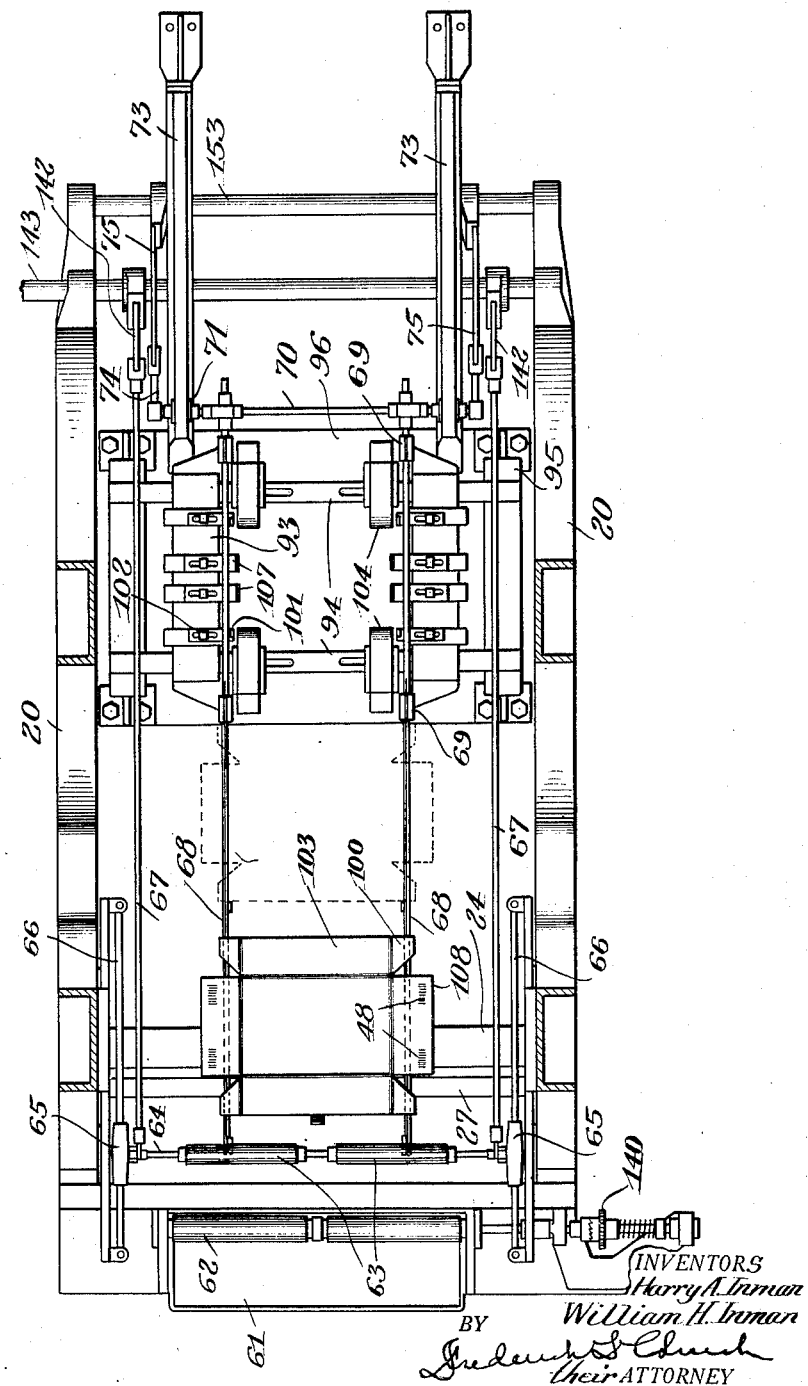

Sept. 29, 1925.
H. A. INMAN ET AL
BOX MAKING MACHINE
Filed Nov. 15, 1922
1,555,010
9 Sheets-Sheet 6
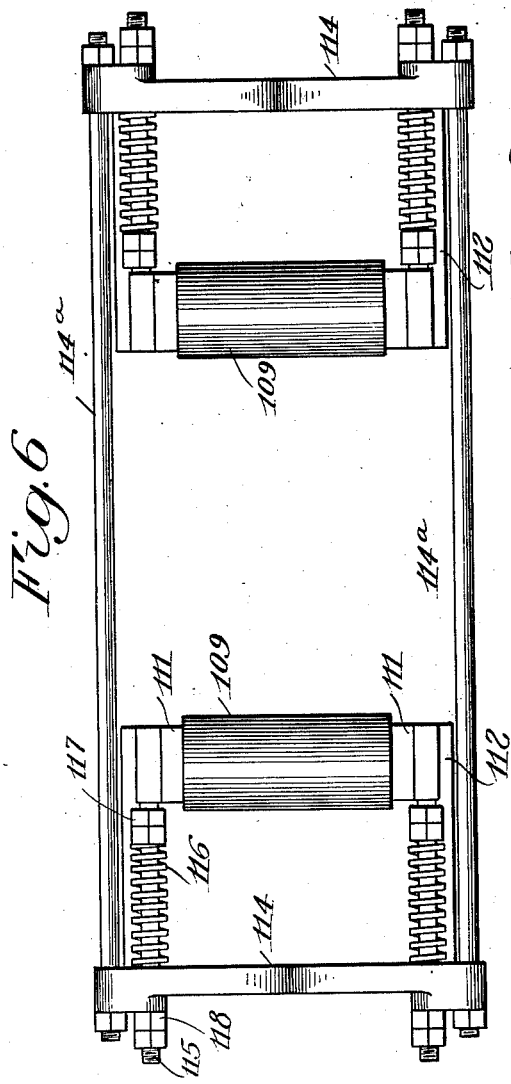
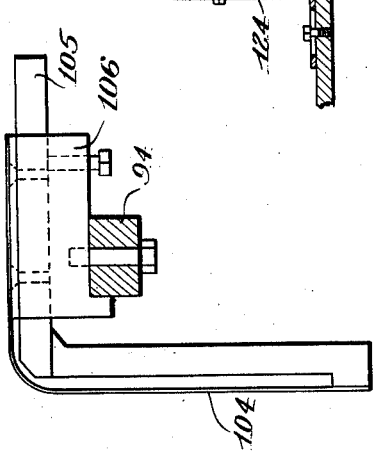
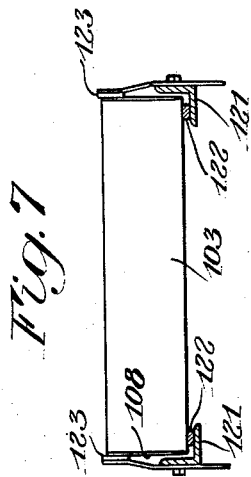
INVENTORS
Harry A. Inman
BY William H. Inman
their ATTORNEY

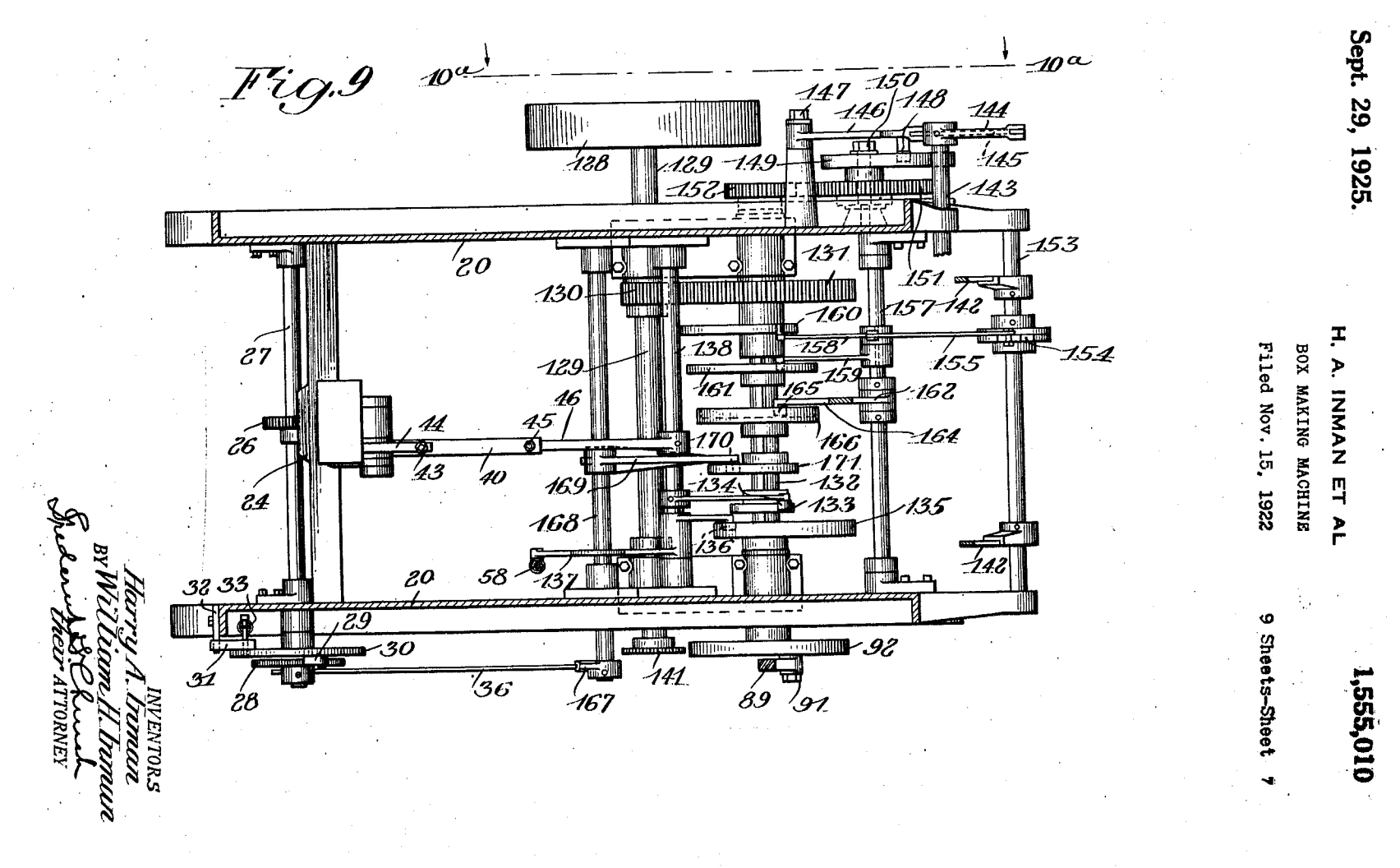

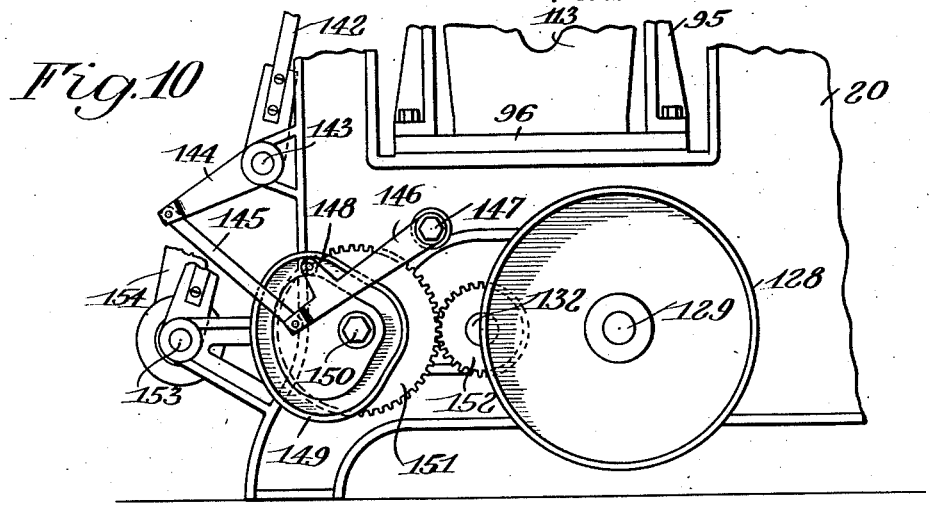
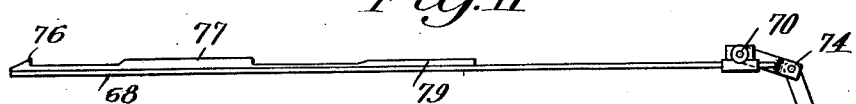
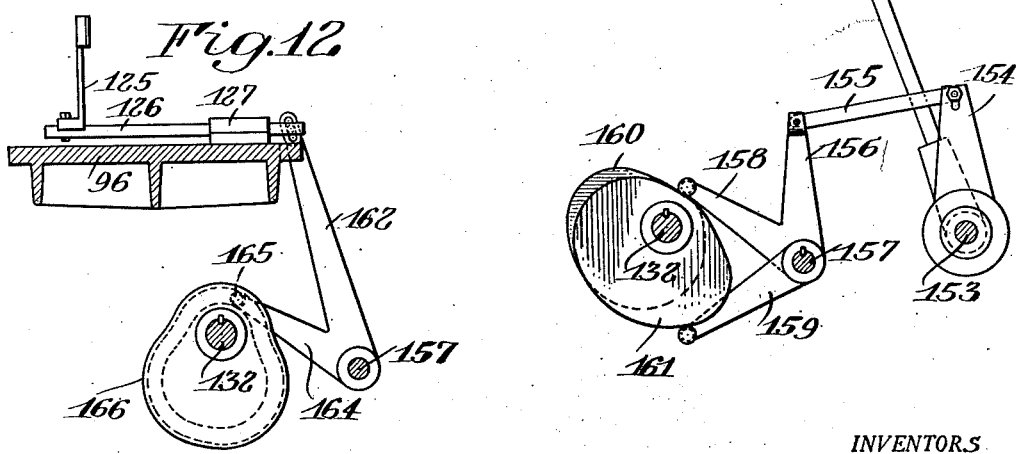

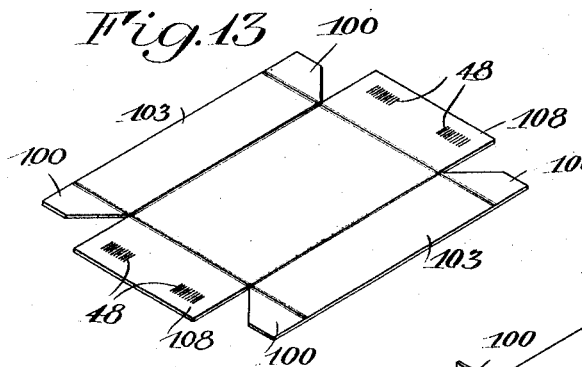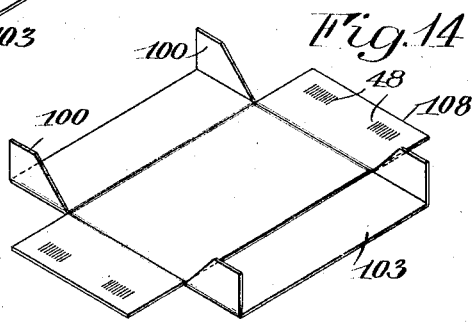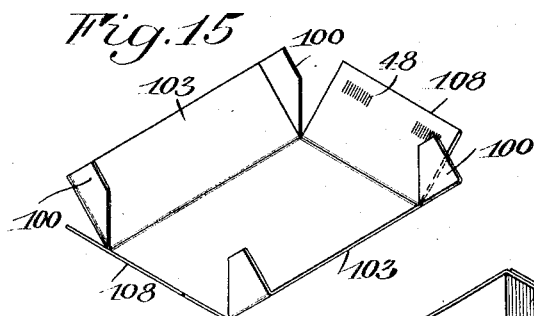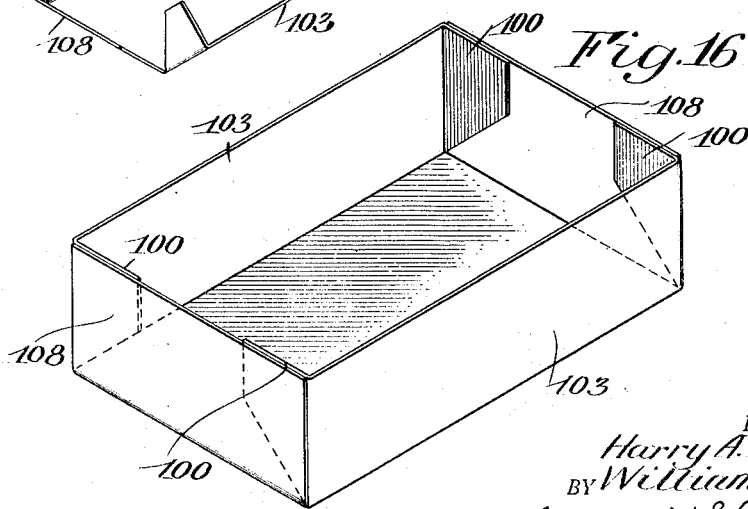

Patented Sept. 29, 1925.

1,555,010

UNITED STATES PATENT OFFICE.

HARRY A. INMAN AND WILLIAM H. INMAN, OF NEWARK, NEW YORK.

BOX-MAKING MACHINE.

Application filed November 15, 1922. Serial No. 601,140.

*To all whom it may concern:*

Be it known that we, HARRY A. INMAN and WILLIAM H. INMAN, citizens of the United States, and residents of Newark, in the county of Wayne and State of New York, have invented certain new and useful Improvements in Box-Making Machines; and we do hereby declare the following to be a full, clear, and exact description of the same, reference being had to the accompanying drawings, forming a part of this specification, and to the reference numerals marked thereon.

This invention relates to box making and more particularly to apparatus for making boxes of the variety formed by gluing and folding blanks of sheet material such, for example, as paper, cardboard and the like, one object of the invention being to provide apparatus of this character having a practical and efficient form of construction capable of accomplishing accurate work at a high rate of speed.

Another object is to provide apparatus of this variety in which the operating parts are of relatively light weight and have movements of relatively small amplitude so that they may be rapidly actuated to afford a high rate of production.

A further object is to provide such apparatus having accurate and rapid folding mechanism. More specifically stated, it is one of the objects to provide a folding mechanism capable of the rapid production of accurately dimensioned boxes having thin folded portions effectively and permanently pressed and glued in place, and at the same time to produce a mechanism adapted to apply a readily controlled and substantial pressure to the blank folds for this purpose without danger of undue strain on the mechanism due to inequalities in the work.

A further object is the provision of apparatus of such construction and arrangement that after the box is once folded its glued folds are continuously held in place during a substantial period of time to afford opportunity for permanent setting of the glue before the box is finally discharged from the machine.

Another object is to provide apparatus of the above character the various parts of which may be quickly and fully adjusted throughout to suit the work in hand.

Still a further object is the provision of practical and reliable mechanism for actuating the blank stack support to feed the blanks as well as efficient and compactly arranged mechanism for actuating the other operating parts of the machine. To these and other ends the invention consists in certain improvements and combination of parts, all as will be hereinafter more fully described, the novel features being pointed out in the claims at the end of the specification.

In the drawings:

Figure 1 is a side elevation of apparatus embodying the present invention.

Figure 2 is a longitudinal, central sectional elevation of the same, showing the operating parts.

Figure 3 is a similar view showing the parts, however, in different positions.

Figure 4 is a sectional plan view taken above the blank carrying and folding means.

Figure 5 is an enlarged sectional elevation on the line 5ª—5ª of Figure 2.

Figure 6 is an enlarged plan view, detached, of the roller means for pressing the folded blank.

Figure 7 is a detailed sectional elevation on the line 7ª—7ª of Figure 3.

Figure 8 is an enlarged elevation of one of the blank folding members as viewed from the line 8ª—8ª in Figure 5.

Figure 9 is a sectional plan view through a lower portion of the machine to illustrate the actuating mechanism.

Figure 10 is an enlarged side elevation of portions of the actuating mechanism as viewed from the line 10ª—10ª in Figure 9.

Figure 11 is an enlarged side elevation of the blank carrying means and its actuating mechanism.

Figure 12 is an enlarged sectional side elevation showing the means for ejecting the folded boxes through the discharge channel. together with a portion of the actuating mechanism therefor.

Figures 13 to 16 inclusive illustrate the blank and the progressive steps of folding the same.

Figure 17 is a detailed sectional view on the line 17ª—17ª in Figure 3.

Similar reference numerals throughout the several views indicate the same parts.

The invention is embodied in the present instance, by way of illustration of the principles involved, in an apparatus or machine for making boxes, such, for example, as egg containers, of blanks of heavy paper or cardboard, previously cut into suitable shape and scored ready for gluing and folding. The machine comprises, generally speaking, a blank stack support, with means for applying glue to and feeding the blanks one by one from the top of the stack, suitable mechanism being provided for automatically adjusting the stack support as the blanks are fed therefrom. The glued blanks are then transferred by a reciprocating carrier to folding mechanism comprising a vertically reciprocating plunger, or former, cooperating with a plurality of adjustable folding members or fingers which operate to fold the blank during the movement of the former in one direction. The folded blank is carried by the former beyond the folding members into engagement with spring actuated pressing rollers, which apply an effective pressure to the glued folds for securing the same in place. Other devices then strip the box from the former and eject the same through an elongated discharge channel or passageway in which the boxes remain for a brief interval in contact with means for maintaining pressure on the folds during the setting of the glue. The various operating parts are compactly supported in a suitable frame which also supports compactly arranged actuating mechanism for the same.

Referring more particularly to the drawings, there is shown in Figure 1 a main frame comprising side portions 20 connected by suitable cross members as shown in Figures 2 and 3. At the front of the machine is shown a stack 21 of blanks carried on supporting means comprising a plate 22 on the upper end of a vertical post 23 sliding in a bearing 24 on one of the cross members of the frame. Post 23 is provided with a rack 25 meshing with a pinion 26 fixed centrally on a shaft 27 rotatably supported in suitable bearings on the frame. The shaft extends beyond the right hand side of the frame and has fixed thereon a ratchet wheel 28 with which cooperates a pawl 29 carried by a disk 30 rotating on the shaft. The disk has a stop lug 31 arranged to engage a shoulder 32 on the frame to limit its rotation in one direction produced by a tension spring 33 fixed to the disk and to the frame. The disk carries a pin 34 loosely embraced by the forked ends 35 of a pitman 36 which is given a reciprocating motion by a portion of the actuating mechanism hereafter described. It is apparent from this construction that the reciprocation of pitman 36 tends to rotate disk 30 in one direction through a small angle and thereby tension spring 33. The disk is intermittently retained in such advanced position by the pawl and ratchet connection with shaft 27 and through the latter raises post 23 and the blank stack supported thereby whenever the latter is released by locking mechanism hereafter described.

The means for normally locking and intermittently releasing the blank stack support or post 23 comprises, preferably, a pin 37, Figure 2, sliding toward and from engagement at one end with the post in a bore in the post bearing. The pin lies in contact at its other end with a shoulder portion 38 of a transverse shaft 39 having fixed thereon an arm 40 normally urged upwardly by a compression spring 41 supported at its lower end on a bracket arm 42. The spring thus tends to rotate shaft 39 and thereby press pin 37 into locking engagement with the post 23. Rotation of the shaft in this direction is limited by a stop screw 43 adjustably carried in a bracket arm 44. Arm 40 is loosely connected at its outer end by means of a bolt 45 with the forward end of a lever 46 which is given an oscillating movement by a portion of the actuating mechanism hereafter described. Lever 46 has a suitable amount of lost motion on bolt 45 so that its effect is to intermittently depress arm 40 and thereby release the blank stack support. This motion is preferably imparted each time a glue pad hereafter described reciprocates into engagement with the uppermost blank of the stack for gluing and feeding the same, and at such time the stack support adjusting means, described above, adjusts the stack upwardly to insure proper contact of the glue pads with the uppermost blank, as well understood in the art.

The means for gluing and feeding the blanks from the top of the stack comprises, preferably, a number of glue applying members or pads 47, Figure 2, of which in the present instance there are four arranged as shown by the indicated glued portions 48, Figure 13. These glue pads are carried by adjustable posts 49 depending from heads 50 adjustably fixed on a transverse rod 51 fixed on the lower end of a rod 52 reciprocating vertically in bearings 53 on a cross member of the frame. Rod 52 has adjustably secured thereto a collar 54 with which is pivotally connected a link 55, pivotally connected also with a lever or walking beam 56 pivotally supported by a shaft 57 extending transversely of the upper portion of the frame. The other end of lever 56 is connected by means of a link 58 with the actuating mechanism as hereafter described, the oscillation of lever 56 serving to reciprocate the glue pads vertically toward and from the blank stack. The uppermost blank of course adheres to the pads and is raised by the latter until it strikes stripper means or plates 59 carried by a transverse bar 60 which detach the blank during the continued upward movement of the pads and cause it to drop on a blank carrier which is intermittently moved under the stripper means, as hereafter described.

The means for applying glue to the pads comprises, preferably, a glue box 61 carried by the frame across its forward end and provided with dipping supply rolls 62. Engaging with the latter are transfer rolls 63 carried by a shaft 64 supported at its ends in shoes 65 sliding on guide rods 66 at the sides of the frame. Connected with shaft 64 are links 67 connected at their opposite ends with the actuating mechanism, as hereafter described, it being apparent that reciprocating motion imparted to links 67 reciprocates the transfer rolls 63 from the glue box past the glue pads which are engaged while in their uppermost position by the transfer rolls and suitably supplied with glue after each feeding operation.

Carrier means are provided for receiving the blanks fed as described from the stack, moving the blanks rearwardly of the machine and delivering the same to the folding mechanism. The blank stack support and folding mechanism are located at some distance from each other and an important feature of the present invention resides in the provision of a carrier for effecting movement of the blanks through this distance but itself having a movement of relatively small amplitude, which enables it to be operated more rapidly and with a more compact arrangement of parts. At the same time, this movement of the blanks is taken advantage of and so effected as to provide a brief period between the application of the glue and the folding of the blanks to permit the glue to become tacky. These advantages are obtained by giving to the carrier an elongated shape and a relatively short reciprocating motion and providing means for advancing the blanks progressively from one position to another longitudinally of the carrier during successive reciprocations thereof, the carrier being of sufficient length for this purpose to support two or more blanks simultaneously.

The carrier is shown as comprising preferably a pair of rods or bars 68 extending from front to rear of the machine in spaced relation as shown in Figure 4. These rods reciprocate longitudinally in guides or bearings 69 on the frame, motion being imparted thereto by connections with the opposite ends of a transverse shaft 70 supported by cross heads 71 sliding in guideways 72 formed in rear extensions 73 of the frame. Pivotally connected with the cross heads are links 74 connected at their opposite ends with arms 75 which are swung through the necessary angle by a portion of the actuating mechanism hereafter described.

The carrier rods 68 are each provided on top of their forward ends with hook-like projections 76. Rearwardly of these, each bar has an elongated projecting portion or ridge 77 for a purpose which will presently appear and the rear end of each projection 77 forms a second hook-like projection 78 for each rod, rearwardly of which each rod is provided also with a second elongated projection or ridge 79. Depending from brackets carried by the frame sides are resilient fingers 80 having rearwardly and downwardly turned ends arranged to bear with suitable pressure against the carrier projections or ridges 77 and 79 during the reciprocation of the latter. It is apparent from this construction that the carrier may be moved forwardly beneath a lifted blank just as the latter is stripped from the glue pads as shown in Figure 2, so that the blank falls upon the carrier rods with its edge in rear of the forward hook 76 of the rod. Rearward movement of the carrier to the position shown in Figure 3 brings the rear portion of the blank resting on the carrier ridge 77 under fingers 80, the pressure of which and the inertia of the blank retain the latter in such position when the carrier again moves forward to receive a second blank at its forward end. During such return or forward movement of the carrier the forward edge of the first blank falls in rear of the second carrier hooks 78, as shown in Figure 2, and the next rearward movement of the carrier moves the first blank under the former of the folding mechanism which comes down between the carrier rods and sweeps the blank from the latter past the folding members. The carrier itself thus has a relatively short motion so that it may be moved rapidly, a plurality of blanks being simultaneously carried by and moved progressively along the carrier through a distance which is a multiple of the amplitude of movement of the carrier. Such movement affords a brief interval, during which the glue becomes tacky and ready for folding. While in the present instance the carrier supports simultaneously but two blanks, the parts may be of course so constructed and arranged, having reference to the size of the blanks, as to simultaneously support a larger number and provide a longer interval between the gluing and folding operations.

The folding mechanism comprises a former which is reciprocated vertically to carry a blank through a substantially rectangular frame on which are adjustably disposed about the sides of the former a plurality of folding members or fingers, the blank being completely folded during its passage downwardly through such frame. The former is shown at 81, Figures 2 and 3, as a substantially rectangular block on the lower end of a standard 82 reciprocating vertically in a bearing 83 carried by a cross member 84 of the frame. The standard is formed with rack teeth meshing with a pinion 85 fixed on a shaft journaled in the sides of the frame. The shaft projects exteriorly of the frame at one end, Figure 1, where it has fixed thereon a pinion 87 meshing with a rack 88 on the upper end of a rod 89 sliding in a keeper or bearing 90 pivoted on shaft 86, the rod being connected at its lower end with a crank pin 91 on a disk 92 rotated by the actuating mechanism. The former, therefore, has a continuous and rapid reciprocating movement which carries it intermittently downward between the spaced carrier rods which present the blanks beneath the former while the latter is raised. The latter carries the blank downwardly with it through a substantially rectangular frame formed by opposite spaced rails 93 extending from front to rear of the machine and supported at their ends on spaced transverse rails 94 forming the other opposite sides of the folding frame. Rails 94 rest at their ends on pedestals 95 projecting upwardly on each side of the machine from a bed 96 having ends 97 resting on the sills 98 of window-like openings 99 in the sides of the frame. As the blank is brought down by the former, its flaps 100, Figures 13 and 14, are first engaged and folded upwardly by upwardly projecting folding members 101 adjustably secured, as by means of a set screw 102, Figure 4, on the side rails 93, there being one such member for each of the four flaps adjacent the corners of the blank. Continuing downwardly, the sides 103 of the blank are engaged and folded upwardly by members 104 adjustably secured in any suitable manner on the folding frame rails 94. These members, as more particularly shown in Figure 8, each comprise angular portions 105 adjustably carried on a block 106 adjustably mounted on rail 94, the parts being so constructed and arranged that the folding member 104, which is preferably of resilient strip material, is supported at its lower end only on part 105 so as to be somewhat yielding.

While the sides 103 of the box are being folded upwardly so described, additional folding members 107, adjustably secured on rails 93, engage and fold upwardly the ends 108 of the box carrying the glued portions. As the former passes downwardly through the frame the box is thus completely folded by the various members described which effectively press the folds into place to be held by the applied glue.

An important feature of the invention resides in the provision of spring actuated rollers located below the folding frame for additionally pressing the blank folds and fixing the same in place. These rollers are shown at 109 as rotatably supported by trunnions 110 mounted at their ends on links 111 pivotally supported at their lower ends on pedestals 112 extending upwardly from a bracket 113 carried by the bed plate 96. The brackets also include upwardly branching standards 114 provided with openings slidably carrying spindles 115 connected in any suitable manner at their enlarged other ends with links 111 or the ends of trunnions 110. Coiled about each spindle is a compression spring 116 bearing at one end against standard 114 and at the other against a pair of lock nuts 117 on the spindle by means of which the tension of the spring may be adjusted. Lock nuts 118 on the outer end of the spindle limit the inward movement thereof and also the movement of links 111 and rollers 109 toward the path of the former. It is obvious from this construction that springs 116 urge rollers 109 to a position adjacent the path of movement of the former and into position for applying a substantial pressure to the folds of the blanks while on the former. The rollers thus apply an equal and balanced pressure against opposite sides of the former and this pressure is not only readily adjustable but operates automatically and instantaneously upon descent of the former and requires no power driven actuating means. It is to be noted that the springs for actuating the rollers operate advantageously in the line of their action, and in order to relieve the stresses imposed upon the standards 114 the latter are tied together in pairs across the machine by rods 114 adjacent the springs 116 as shown. Thus, should material of thickness excessive for the adjustment of tension be passed through the machine, the latter would not be injured.

The above description of the construction and operation of the former, folding members and pressing rollers will now make clear an advantageous arrangement of these cooperating parts for insuring accuracy in the dimensions of the finished box. During the folding operation, the glued ends of the box may engage the side flaps 100 before these parts are completely positioned and thus tend to dispose the sides 103 at a greater distance from each other at their tops than at their bottoms, in other words, to produce an outward flare in the sides from bottom to top. The same inaccuracy may be introduced by pressing surplus material into the sides of the box through the sharp bending of the corners by the heavy pressure applied by the pressing rollers. To overcome these tendencies to inaccuracy, the former is slightly tapered outwardly from top to bottom at the opposite sides thereof corresponding to the sides 103 of the box as shown in Figures 2 and 3. The resiliently yielding folding members 104, coacting with these tapered sides of the former, follow the inclination of the former sides and press the sides of the box into a correspondingly folded position. Then when pressure is applied by the rollers to the ends of the box, the tendency to spread the sides 103 at their tops brings them back precisely to vertical position, the folding members 104 being adapted to yield for this purpose if necessary. The inclination or taper of the sides of the former is determined of course by the character of the material and of the shape of the box to be made therefrom.

When the former carries the box below the pressing rollers, at the end of its downward movement, the completely folded box is engaged at the upper edges of its ends by stripping elements or hooks 119 which operate when the former moves upwardly to strip the box therefrom. Hooks 119 are supported by resilient strips 120 adjustably secured to the vertical flanges of angle bars 121, arranged in parallel spaced relation below and on opposite sides of the folding frame. These bars are so spaced that the box fits closely between the vertical flanges and rests at its bottom on tracks or strips 122 on the horizontal flanges. Hooks 119 have shanks 119$^a$ arranged to assist the angle bars in holding the end folds in place. The angle bars thus form a chute or channel for receiving the boxes from the folding mechanism and for discharging the same from the machine and the glued end folds are thus continuously held in place after being folded until discharged from the machine. The bars are preferably of a substantial length as shown in Figures 2 and 3 to accommodate simultaneously a plurality of boxes and are provided with rails 123 adjustably supported on the bars for additionally pressing the blank folds at the glued portions thereof to maintain the same in place for an interval during the setting of the glue. The glued end folds are thus continuously held in place after being folded until discharged from the machine. The bars 121 are themselves vertically adjustable on posts 124 which are adjustable transversely of the machine so that the stripping elements and the channel or discharge means for the boxes are fully adjustable to suit the size and shape of the box.

As each box is received in the discharge channel it is advanced to make way for a succeeding box by a pusher or ejector 125 of suitable shape fixed on a rod 126 reciprocating longitudinally of the machine in a bearing 127 on bed 96. The rod is moved by a connection with the actuating mechanism hereafter described.

The actuating mechanism where the machine is belt driven comprises, preferably, a pulley 128 on a shaft 129 journaled in the sides of the frame and connected by means of gears 130 and 131 with a main cam shaft 132 for driving the latter. Shaft 132 carries a cam 133 cooperating with a roller follower 134 on the end of lever 46 previously described for releasing the blank stack support. The shaft carries also a box cam 135 having a follower 136 on one arm of a lever 137 pivotally supported on a cross shaft 138 and connected at its other arm with the link 58 for reciprocating the glue pads. A chain 139, Figures 1 and 9, engages a wheel sprocket 140 on a trunnion of the glue box roll 62 for rotating the latter, the chain being passed at its other end about a sprocket 141 on the main shaft 129. The transfer roll 63 is reciprocated by connecting its actuating links 67 with an arm 142 on a shaft 143 having an arm 144, Figure 10, connected by means of a link 145 with the outer end of an arm 146 pivotally supported on the frame at 147. Arm 146 carries intermediate its ends a roller 148 cooperating with a box cam 149 on a short shaft 150 rotating in a bearing on the frame and connected by gears 151 and 152 with the cam shaft 132. The former is connected, as described, with disk 92, Figures 1 and 9, which is fixed on one end of the cam shaft 132 so that the rotation of the latter serves to continuously reciprocate the former. The carrier means comprising rods 68 is reciprocated as described by an arm 75, Figures 2 and 11, fixed on a shaft 153 carrying also an arm 154 connected by link 155 and an arm 156 with a shaft 157. The latter is provided with spaced arms 158 and 159 cooperating respectively with a pair of cams 160 and 161 on cam shaft 132. The box ejector 125 is reciprocated as described by its link 126 which is connected with an arm 162 on a shaft 157 carrying also an arm 164 having the roller 165 cooperating with a box cam 166 on the cam shaft 132. The link 36 for retensioning the spring actuating means for the blank stack is connected with an arm 167 on a shaft 168 having an arm 169 and follower 170 engaging a cam 171 on shaft 132. The various operating parts are thus actuated in properly timed sequence by a comparatively simple and compact mechanism.

In operation, the blank stack support having been supplied with blanks, application of power to the driving pulley operates the parts rapidly and automatically in properly timed relation so that the machine, when once adjusted to suit the work in hand, requires little attention on the part of the operator. The transfer rolls 63 reciprocating to and from contact with the glue supply rolls 62, apply glue to the pads 47 which descend into contact with the uppermost blank. At this instant, the blank support is released, adjusted upwardly to insure full contact with the glue pads, and relocked. The pads pick up the top blank which is carried upwardly, stripped from the glue pads and dropped on carrier rods 68 which are reciprocated forwardly under the blank as the latter engages the stripper means. The carrier moves the blank partway toward the folding mechanism where it is held by fingers 80 and the carrier then returns for a second blank. The second rearward movement of the carrier disposes the first blank under the former of the folding mechanism which is continuously reciprocating and descends to carry the blank through the folding frame, where the blank is folded in two directions during its downward movement, and the folds fixed in position by the pressing rolls. Having passed the latter, the completed box is stripped and dropped into the discharge channel through which it is moved slowly by the ejector 125. The stripper and channel hold the glued folds of the boxes in place during the discharge movement, thus affording an opportunity for the setting of the glue. The blank stack is continuously adjusted upwardly for proper contact with the glue pads and the carrier receives the blanks one by one from the latter and presents them to the former by which the folding and pressing operations are rapidly repeated. The operating parts are comparatively light in weight and have a movement of relatively small amplitude, so that the machine may be operated at high speed with a consequently high rate of production. While the main frame includes but a single box making apparatus in the present instance, it is obvious that two or more such units may be economically constructed together to increase production by duplication of the parts and principles described.

We claim as our invention:

1. In a box making machine, the combination of blank feeding and gluing means, folding mechanism spaced from said means comprising a moving former and adjustable folding means cooperating therewith, spring actuated rollers adjacent the path of movement of said former for pressing the folded blank, an elongated slide for carrying simultaneously a plurality of blanks, actuating means for reciprocating said slide into position at one end to receive the blanks from said feeding and gluing means and into position at the other to present the same to said folding mechanism, and devices for holding the blanks against return movements with the slide and for advancing the same step by step toward said folding mechanism during forward movements of the slide.

2. In a box making machine, the combination of blank feeding and gluing means, a former and means for reciprocating the same, folding members cooperating with said former to fold the blank, and rollers spring actuated to position to engage and press the glued blank folds against the former during the movement of the latter.

3. In a box making machine, the combination of blank feeding and gluing means, a former and means for moving the same, folding members cooperating with the former to fold the blank about the same during movement thereof comprising members located in advance of each other for folding the same side of the blank in two directions successively, rollers movably supported adjacent the path of movement of the former, and spring means for urging said rollers against the glued blank folds to press the same against the former during movement thereof.

4. In a box making machine, the combination of blank gluing and feeding means, a support provided with adjustable folding members, a former and means for reciprocating the same past said support to fold a blank thereon, rollers movably supported adjacent the path of movement of the glued blank folds, and spring means for actuating said rollers to press said folds against the former during movement of the latter.

5. In a box making machine, a blank folding mechanism comprising a frame, folding members thereon, a former and means for moving the same past said members to fold a blank, rollers movably supported on said frame adjacent the path of movement of the folds of a blank carried by said former, and spring actuated means connecting said frame and rollers for pressing the latter against the blank folds and for limiting the movement of the rollers toward the former.

6. In a box making machine, a blank folding mechanism comprising a frame, folding members thereon, a former and means for moving the same past said members to fold a blank, pressing rollers and means movably supporting the same on said frame adjacent the path of movement of the folds of a blank carried by said former, spindles connecting said frame and roller supporting means, and compression springs coiled on said spindles between said frame and roller supporting means for actuating the rollers to press the blank folds between the latter and the moving former.

7. In a box making machine, a blank folding mechanism comprising a frame, folding members thereon, a former and means for moving the same past said members to fold a blank, links pivotally carried by said frame, rollers carried by said links adjacent the path of movement of the folds of a blank on said former, spindles connected with said links and movably connected with said frame, compression springs coiled about said spindles between the frame and said links to press said rollers toward the former, tension adjusting means for said springs and adjustable means for limiting movement of said rollers toward the former.

8. In a box making machine, the combination of a frame, folding members carried thereby, a former and means for moving the same past said members to fold a blank about the former, spring actuated rollers for pressing the blank folds against the former, stripping elements for removing the boxes from the former, a receiving channel for holding simultaneously a plurality of boxes and maintaining the folds thereof in place, and ejecting means for moving the boxes through said channel.

9. In a box making machine, the combination of a frame, folding members carried thereby, a former and means for effecting relative movement between said members and former for folding a blank about the former, spring actuated rollers for pressing the blank folds against the former, an elongated channel for receiving the boxes from the former, said channel being arranged to hold simultaneously a plurality of boxes and provided with means for holding the folds thereof in place, and ejecting means for ejecting the boxes one at a time from the channel.

10. In a box making machine, the combination of a frame, blank gluing and feeding means, folding members on the frame, a former and means for effecting a relative movement between said members and former for folding a blank about the former, a channel for receiving the boxes provided with means for holding the folds in place, said channel having a length adapted for holding a plurality of said boxes simultaneously to afford a period for the setting of the glue, and ejecting means for moving the boxes through said channel.

11. In a box making machine, the combination of a frame, blank gluing and feeding means, folding members on the frame, a former and means for effecting a relative movement between said members and former for folding a blank about the former, an elongated channel for receiving the boxes comprising means for supporting the box bottom and side portions for holding the glued folds in place, said channel having a substantial length for holding simultaneously a plurality of boxes and affording a period for the setting of the glue, and ejecting means for moving the boxes through said channel.

12. In a box making machine, the combination of a frame, blank gluing and feeding means, folding members on the frame, a former and means for effecting a relative movement between said members and former for folding a blank about the former, a stripping element for detaching the boxes from the former, a pair of angle bars adjustably arranged in spaced relation on said frame to form a channel for receiving and slidably supporting the boxes, adjustable side rails for maintaining pressure on the glued folds of the boxes in said channel, said channel having a substantial length to afford a setting period for the glue, and ejecting means for moving the boxes through said channel.

13. In a box making machine, the combination of blank gluing and feeding means, blank folding mechanism comprising folding members, a former and means for effecting relative movement between said members and former to fold a blank about the former, an elongated reciprocating carrier adapted to hold simultaneously a plurality of successive blanks and provided with means for advancing said blanks from said gluing and feeding means to said folding mechanism by an intermittent stepped movement produced by successive reciprocations of said carrier, and an elongated channel for receiving the boxes from said former adapted to retain a plurality of successive boxes simultaneously and provided with means for pressing the folds thereof during the setting of the glue.

14. In a box making machine, the combination of blank gluing and feeding means, blank folding mechanism comprising a former provided with a rack, a pinion meshing with said rack, actuating means for producing a continuous oscillating rotary movement of said pinion and a continuous reciprocating movement of said former and folding members disposed about the path of said former to fold the blank thereabout, a carrier for supplying the blanks from said gluing and feeding means to said folding mechanism, and a channel for receiving the boxes from the former provided with means for pressing the folds thereof during the setting of the glue and subsequently discharging the boxes from the machine.

15. In a box making machine, the combination of an adjustable blank stack support, a glue applying element movable toward and from said support to glue and feed the blanks, spring means for adjusting the support toward said element, actuating means for retensioning said spring means, locking means for said support and mechanism for releasing the support from said locking means when said element is moved toward said support.

16. In a box making machine, the combination of an adjustable blank stack support, a glue pad having a reciprocating movement toward and from said support, spring means normally urging said support toward said pad, actuating means for intermittently retensioning said spring means, locking means normally holding said support immovable, and mechanism for intermittently releasing said support from said locking means when said pad is moved toward said support.

17. In a box making machine, the combination of an adjustable blank stack support, folding mechanism, means for feeding blanks from the top of the stack to said mechanism, rack and pinion means for adjusting said support, a rotary member, pawl and ratchet means connecting said member and pinion means, spring means for rotating said member to adjust said support through said pawl and ratchet means, actuating means for retensioning said spring means independently of said support, locking means normally holding said support immovable, and mechanism for intermittently releasing the support from said locking means.

18. A box making machine comprising folding members, a former and means for effecting relative movement between said members and former for folding a blank about the former, stripping elements arranged to engage and strip the folded boxes from the former and to maintain pressure on the folds thereof, an elongated channel for receiving the boxes stripped from the former and provided with means for holding the folds thereof in place, said channel having a substantial length adapted for holding a plurality of boxes simultaneously to afford a period for the setting of the glue while the folds are held in place, and ejecting means for moving the boxes through said channels.

19. A box making machine comprising folding members, a former and means for effecting relative movement between said members and former for folding a blank about the former, resilient stripping elements adjustably arranged to engage the folded ends of the box to strip the same from the former and to maintain pressure on the folds thereof to hold the same in place, an elongated channel for receiving the boxes provided with adjustable side portions for holding the folds thereof in place and having a substantial length adapted for holding a plurality of boxes simultaneously to afford an interval for the setting of the glue, and ejecting means for moving the boxes progressively through said channel whereby the box folds are continuously held in place after being folded until discharge from the machine.

20. A box making machine comprising a movable former having tapered sides, folding members cooperating with said former to fold the blank thereabout, said members on two opposite sides of the former being yieldably constructed, and spring actuated rollers for pressing the blank against the other sides of the former intermediate said yieldable members.

21. A box making machine comprising a movable former having two opposite sides thereof tapering in shape, folding members for wrapping the blank about said former with overlapping folds at the sides thereof intermediate said tapered sides, and spring actuated rollers for pressing said overlapping folds against the former.

22. A box making machine comprising a movable former, folding members for wrapping a blank about an end and the adjacent sides of the former with overlapping folds at two opposite sides thereof, said former having its other two sides tapered inwardly from said end thereof, and roller means arranged to press said overlapping folds against the former during the movement thereof and to thereby expand the box sides corresponding to the tapered sides of the former.

HARRY A. INMAN.
WILLIAM H. INMAN.